(12) United States Patent
Rothwell et al.

(10) Patent No.: US 7,793,350 B2
(45) Date of Patent: Sep. 7, 2010

(54) APPARATUS, SYSTEM, AND METHOD FOR SIMULATED ACCESS TO RESTRICTED COMPUTING RESOURCES

(75) Inventors: Stephen Frederick Rothwell, Wanniassa (AU); Christopher Beng Kiat Yeoh, Braddon (AU)

(73) Assignee: International Business Machines Corporation, Armonk, NY (US)

( * ) Notice: Subject to any disclaimer, the term of this patent is extended or adjusted under 35 U.S.C. 154(b) by 1142 days.

(21) Appl. No.: 10/975,832

(22) Filed: Oct. 28, 2004

(65) Prior Publication Data

US 2006/0101522 A1    May 11, 2006

(51) Int. Cl.
*H04L 9/00* (2006.01)

(52) U.S. Cl. .............. 726/26; 726/1; 726/2; 726/4; 726/16; 726/17; 726/27; 713/1; 713/100; 713/165; 713/167; 713/189; 709/202; 709/226

(58) Field of Classification Search ............. 726/16, 726/24, 25, 26, 1; 713/185, 186, 187, 188, 713/189, 1, 100; 719/328; 707/9, 10; 709/202, 709/226

See application file for complete search history.

(56) References Cited

U.S. PATENT DOCUMENTS

| | | | |
|---|---|---|---|
| 5,491,808 A * | 2/1996 | Geist, Jr. ................. | 711/100 |
| 6,449,643 B1 * | 9/2002 | Hyndman et al. ........ | 709/223 |
| 6,523,119 B2 | 2/2003 | Pavlin et al. ............ | 713/192 |
| 6,526,418 B1 | 2/2003 | Midgley et al. ......... | 707/204 |
| 6,594,671 B1 | 7/2003 | Aman et al. ............ | 707/103 |
| 6,658,573 B1 * | 12/2003 | Bischof et al. .......... | 726/16 |
| 6,795,937 B2 * | 9/2004 | Harris et al. ............ | 714/42 |
| 6,874,149 B1 * | 3/2005 | Bermudez et al. ...... | 719/328 |
| 6,931,519 B1 * | 8/2005 | Keller ..................... | 713/1 |
| 6,996,614 B2 * | 2/2006 | Hallinan et al. ......... | 709/226 |
| 6,996,808 B1 * | 2/2006 | Niewiadomski et al. | 717/130 |
| 7,093,242 B2 * | 8/2006 | Bernadat et al. ........ | 717/166 |

(Continued)

FOREIGN PATENT DOCUMENTS

WO    WO03088015    4/2003

OTHER PUBLICATIONS

G.W. Dunlap et al., "ReVirt: Enabling Intrusion Analysis through Virtual Machine Logging and Replay", Department of Electrical Engineering and Computer Science University of Michigan, pp. 211-224.

(Continued)

*Primary Examiner*—Nasser Moazzami
*Assistant Examiner*—Shanto M Abedin
(74) *Attorney, Agent, or Firm*—Kunzler Needham Massey & Thorpe

(57) ABSTRACT

A simulated access environment overrides function calls pertaining to resources for which the user may be restricted from accessing. The environment also allocates and manages replacement resources that are used in place of access-restricted computing resources in order to enable execution of utilities or applications that would normally abort without enhanced user permissions. In one embodiment, replacement resources are managed by a resource mirror. In certain embodiments, the function calls are statically overridden by linking a replacement library to the utilities or applications. In other embodiments, the function calls are dynamically overridden via software interrupts, replacing entries within a function table, dynamically loading a replacement library, or the like.

23 Claims, 6 Drawing Sheets

U.S. PATENT DOCUMENTS

| | | | |
|---|---|---|---|
| 7,103,529 B2* | 9/2006 | Zimmer | 703/27 |
| 7,120,794 B2* | 10/2006 | Kelley et al. | 713/164 |
| 7,353,507 B2* | 4/2008 | Gazdik et al. | 717/159 |
| 7,454,791 B1* | 11/2008 | Godwin | 726/25 |
| 7,484,242 B2* | 1/2009 | Aggarwal et al. | 726/7 |
| 2001/0029519 A1* | 10/2001 | Hallinan et al. | 709/104 |
| 2002/0019941 A1* | 2/2002 | Chan et al. | 713/185 |
| 2003/0079207 A1* | 4/2003 | Xavier et al. | 717/135 |
| 2003/0172127 A1* | 9/2003 | Northrup et al. | 709/219 |
| 2005/0065994 A1* | 3/2005 | Creamer et al. | 709/202 |
| 2005/0177635 A1* | 8/2005 | Schmidt et al. | 709/226 |
| 2005/0222819 A1* | 10/2005 | Boss et al. | 702/186 |
| 2005/0240906 A1* | 10/2005 | Kinderknecht et al. | 717/136 |
| 2006/0029097 A1* | 2/2006 | McGee et al. | 370/468 |

OTHER PUBLICATIONS

Judith S. Hall et al., "Virtualizing the VAX Architecture", 1991 ACM Digital Library, pp. 380-389.

Elena G. Barrantes et al., "Randomized Instruction Set Emulation To Disrupt Binary Code Injection Attacks", ACM Digital Library, pp. 281-289.

Paul Barham et al., "Xen and the Art of Virtualization", ACM Digital Library, pp. 164-177.

* cited by examiner

APPARATUS, SYSTEM, AND METHOD FOR SIMULATED ACCESS TO RESTRICTED COMPUTING RESOURCES

BACKGROUND OF THE INVENTION

1. Field of the Invention

This invention relates to systems for testing software applications and more particularly relates to simulating permission-based access to computing resources.

2. Description of the Related Art

Considerable effort is required to design and develop software applications that perform effectively under a wide variety of conditions. Often, in an attempt to improve the effectiveness of specific functions, coding changes are made that behave differently than expected. Additionally, changes to one module of code may have unexpected effects on related modules. Furthermore, in some development environments such as an open source development environment, a large number of developers may make changes to the source code.

One method to deal with the dynamic nature of application development and find coding errors is to conduct a build and test sequence at regular intervals. FIG. 1 is a schematic block diagram depicting one embodiment of a prior art build and test system 100. As depicted, the build and test system 100 includes a user environment 110, a build script 115, a test script 120, one or more applications 130, a system level interface 140, and a set of resources 150 such as files 152, directories 154, devices 156, pipes 158, and processes 159. The build and test system 100 may be used to build and test applications under development and thereby identify coding errors, and the like, previous to general distribution of the applications.

The user environment 110 interacts with the user and may respond to commands and interface events involving the user. The user environment allows a user or administrator to define system level variables and parameters such as pathnames and user preferences. In certain implementations, the user environment 110 includes a command shell (not shown) that provides a command line prompt and responds to system level commands input by the user. In one embodiment, the command shell responds to user requests to list directories, view file permissions, and the like.

The build script 115 may retrieve or reference source code (not shown) and invoke a compiler to compile the source code into an executable application 130. In one embodiment, the build script 115 retrieves the latest revision of source code from a source code control system (not shown), and places the code in a designated directory and compiles the code into an executable file 130. After the application is built, the test script 120 executes and exercises the application 130 to find coding errors and may log results from such exercises into a test log (not shown). In conjunction with executing and exercising the application 130, an install process may be conducted to install the application.

The system level interface 140 is typically provided by the operating system and facilitates access to a set of resources 150 such as files 152, directories 154, devices 156, pipes 158, and processes 159. Many applications are constructed in a manner that requires access to restricted resources in order to properly build the application. For example, the build process may change system level files that are protected from access by ordinary users. However, the build and test process is sometimes conducted by ordinary users—particularly in an open source development environment where testing may be conducted by an unknown or unfamiliar party. In such a scenario, the build process may be aborted due to the insufficient privileges of the user.

One prior art solution to such a scenario imitates supervisor or root privileges for an ordinary user without actually securing such privileges. While this may be useful in certain instances and allow program flow to continue further than usual, such a solution will typically fail when a restricted resource is actually accessed.

Another prior art solution involves developing "relocatable" source code which uses relative references to computing resources and may be executed from an arbitrary location or directory. However, developing relocatable source code is a fairly tedious process that further complicates the testing process by introducing additional variables. Additionally, large programming projects may integrate modules maintained by external parties that do not support relocation. Furthermore, distributing a relocatable application may be undesirable due to licensing and security issues.

Given the aforementioned issues and challenges, what is needed are methods and systems to simulate access to restricted resources without actually using the restricted resources.

SUMMARY OF THE INVENTION

The present invention has been developed in response to the present state of the art, and in particular, in response to the problems and needs in the art that have not yet been fully solved by currently available build and test means and methods. Accordingly, the present invention has been developed to provide an apparatus, system, and method to simulate access to restricted computing resources that overcomes many or all of the above-discussed shortcomings in the art.

In one aspect of the present invention, an apparatus to simulate access to restricted computing resources includes at least one replacement function configured to override a function call related to the potentially restricted computing resources, and a resource mirror configured to allocate accessible resources corresponding to access-restricted computing resources (i.e. resources that are inaccessible to the current user). Allocating accessible replacement resources facilitates building and testing an application without actually accessing restricted computing resources.

The apparatus may also include a function interceptor that intercepts function calls related to potentially restricted computing resources. In certain embodiments, the function interceptor first invokes an original function call and then invokes a replacement function if the original function call fails. In one embodiment, the function interceptor is essentially a library of replacement functions that is linked in during a build sequence. In another embodiment, the function interceptor dynamically traps function calls related to access-restrictable computing resources and replaces references to access-restricted computing resources with references to corresponding resources that are accessible by the user.

Examples of computing resources that may be restricted include files, directories, devices, processes, and pipes. Examples of function calls that may attempt to access-restricted computing resources include file system calls, system control calls, interprocess communication calls, and device driver calls.

The apparatus to simulate access to restricted computing resources may further include an environment configured to interact with a user. The environment may include a simulated access shell that invokes the function interceptor or is linked to a library of replacement functions instead of a standard system library. Accordingly, the simulated access shell may appear to the user and the applications launched by the user as a standard shell while leveraging the replacement functions that access accessible computing resources in lieu of restricted computing resources.

In another aspect of the present invention, a method to simulate access to restricted computing resources includes providing a replacement function configured to override a function call related to access-restrictable computing resources, and allocating an accessible resource corresponding to a restricted computing resource. In certain embodiments, the function calls are statically overridden by linking a replacement library to the utilities or applications. In other embodiments, the function calls are dynamically overridden via software interrupts, replacing entries within a function table, dynamically loading a replacement library, or the like.

The method may also include invoking a replacement function in response to a failed function call and/or intercepting the function call and replacing references to access-restricted computing resources with references to accessible computing resources. Additionally, the method may also include switching the current user to an arbitrary user.

Various elements of the present invention may be combined into a system to simulate access to restricted computing resources. In one embodiment, the system includes a digital processing unit configured to execute programs, an operating system, a storage device, and a simulated access environment that overrides function calls involving access-restricted computing resources, and allocates accessible resources corresponding to the access-restricted computing resources.

The present invention provides benefits and advantages over currently available solutions. Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory or storage devices. Similarly, operational data may be identified and illustrated herein within modules, and may be embodied in any suitable form and organized within any suitable type of data structure. The operational data may be collected as a single data set, or may be distributed over different locations including over different memory or storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

Figure 1:
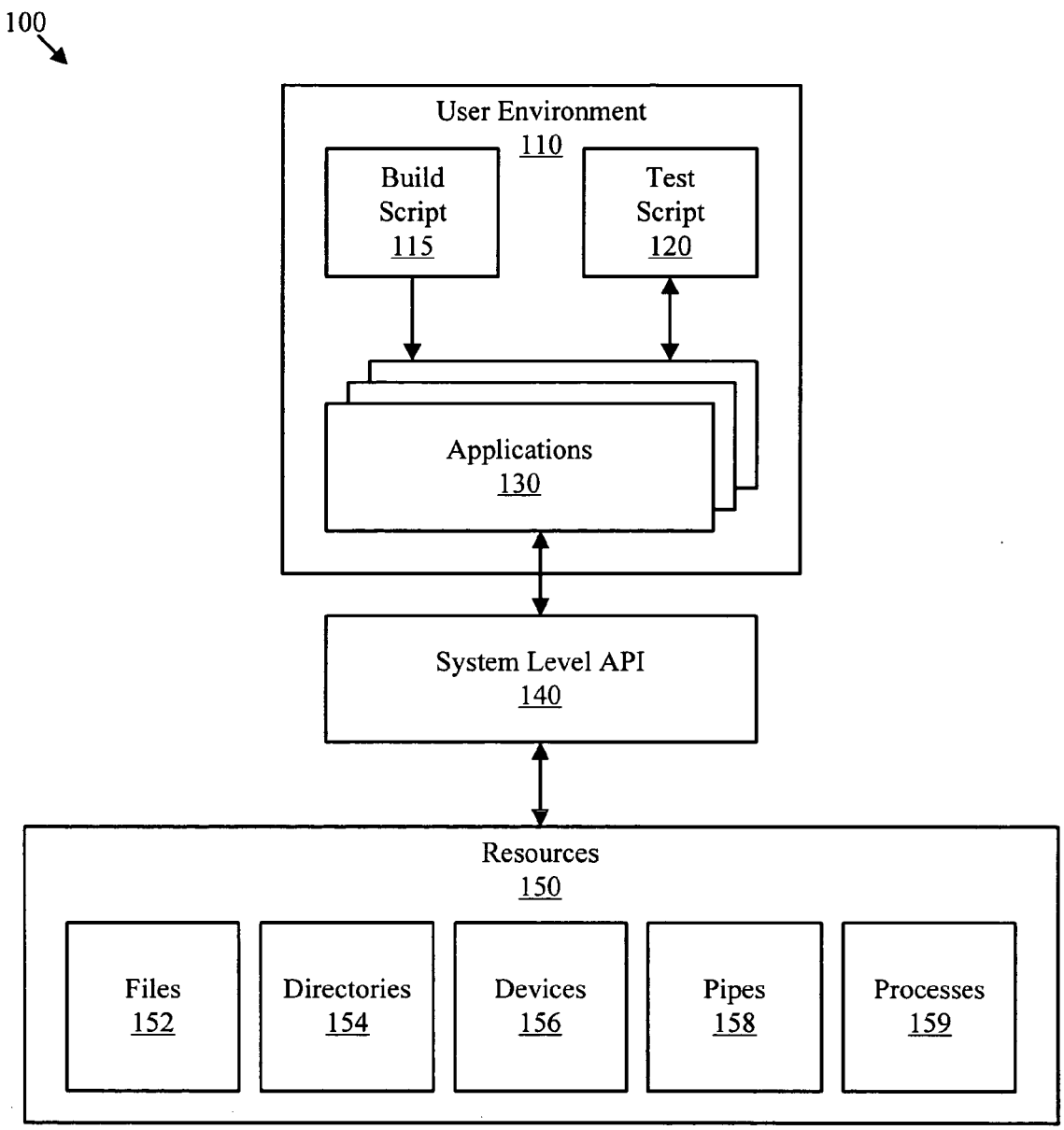
FIG. 1 is a schematic block diagram depicting one embodiment of a prior art build and test system.

The present invention addresses the needs and challenges described in the background section such as those depicted in FIG. 1. Specifically, the present invention provides a system, apparatus, and method to simulate access to restricted resources that allocates and manages accessible resources in place of restricted resources. Allocating and managing accessible resources allows a build and test process, or a similar process, to proceed as if the user had accessed the restricted computing resources.

Figure 2:
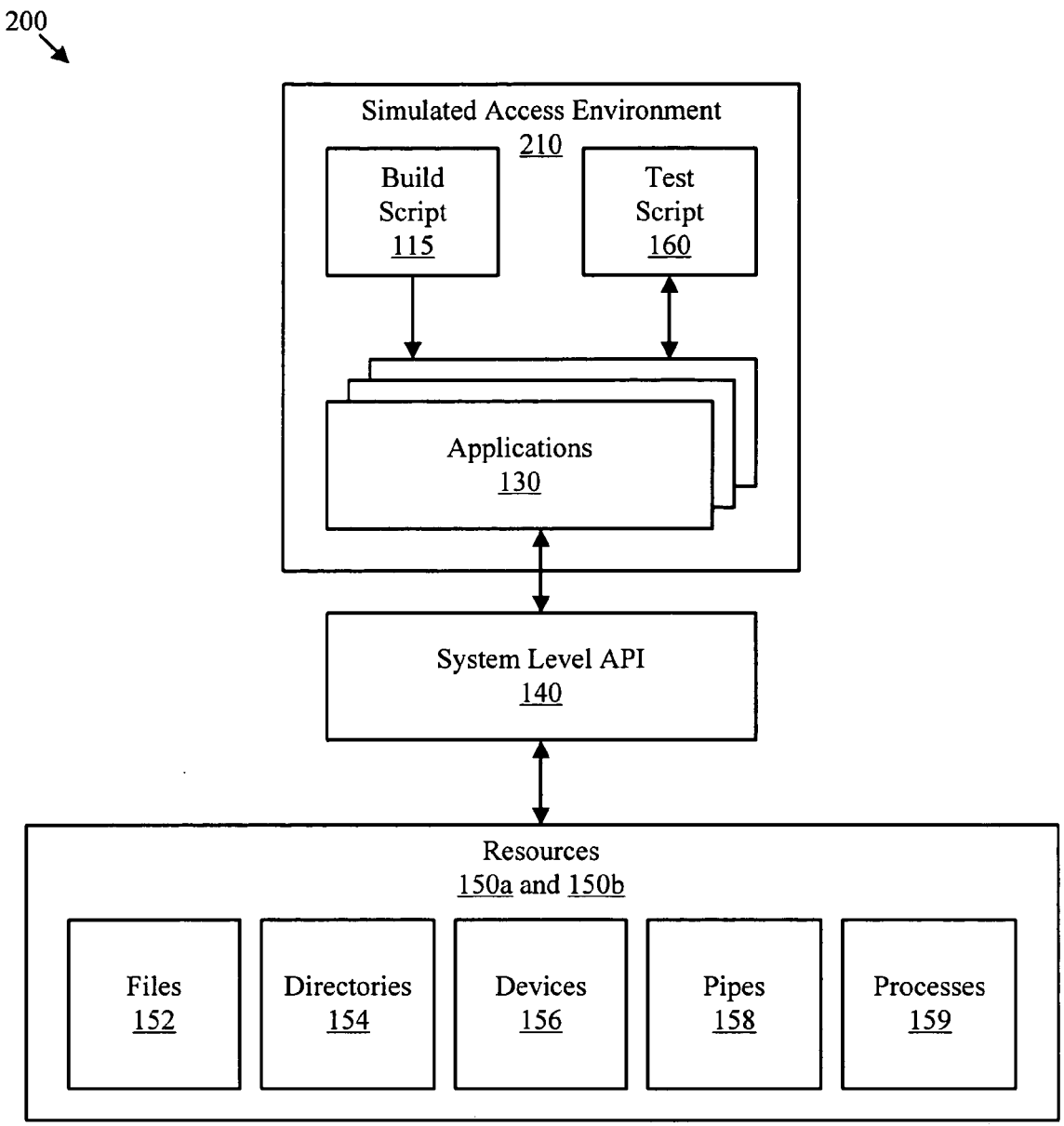
FIG. 2 is a schematic block diagram depicting one embodiment of a simulated access build and test system of the present invention.

FIG. 2 is a schematic block diagram depicting one embodiment of a simulated access build and test system of the present invention. The build and test system 200 includes a simulated access environment. The depicted embodiment also includes as a build script 115, a test script 120, one or more applications 130, a system level interface 140, and a set of resources 150 such as files 152, directories 154, devices 156, pipes 158, and processes 159. While using many of the same elements in a backward compatible manner, the build and test system 200 provides additional functionality over prior art solutions.

The simulated access environment 210 provides an environment that appears as a conventional computing environment for building and testing applications such as the user environment 110 depicted in FIG. 1. In addition, the simulated access environment 210 traps or replaces function calls made by the applications 130 regarding potentially restricted resources 150 and allocates accessible computing resources 150b that are accessed in lieu of restricted computing resources 150a. In certain embodiments, the simulated access environment 210 also maps subsequent access to the restricted computing resources to the allocated replacement resources.

For example, a function call that attempts to write to a system file for which the user lacks permission may be redirected to a file allocated by the simulated access environment 210. Instead of returning an error and causing a build and test process to abort or malfunction, an actual write operation would occur to an accessible replacement resource. Using accessible replacement resources facilitates building and testing applications by users who generally lack sufficient privileges to use restricted computing resources while maintaining the security of the computing system from malicious or ignorant users. Consequently, accessing the replacement resources generally provides the same result as accessing the initial resources.

Figure 3:
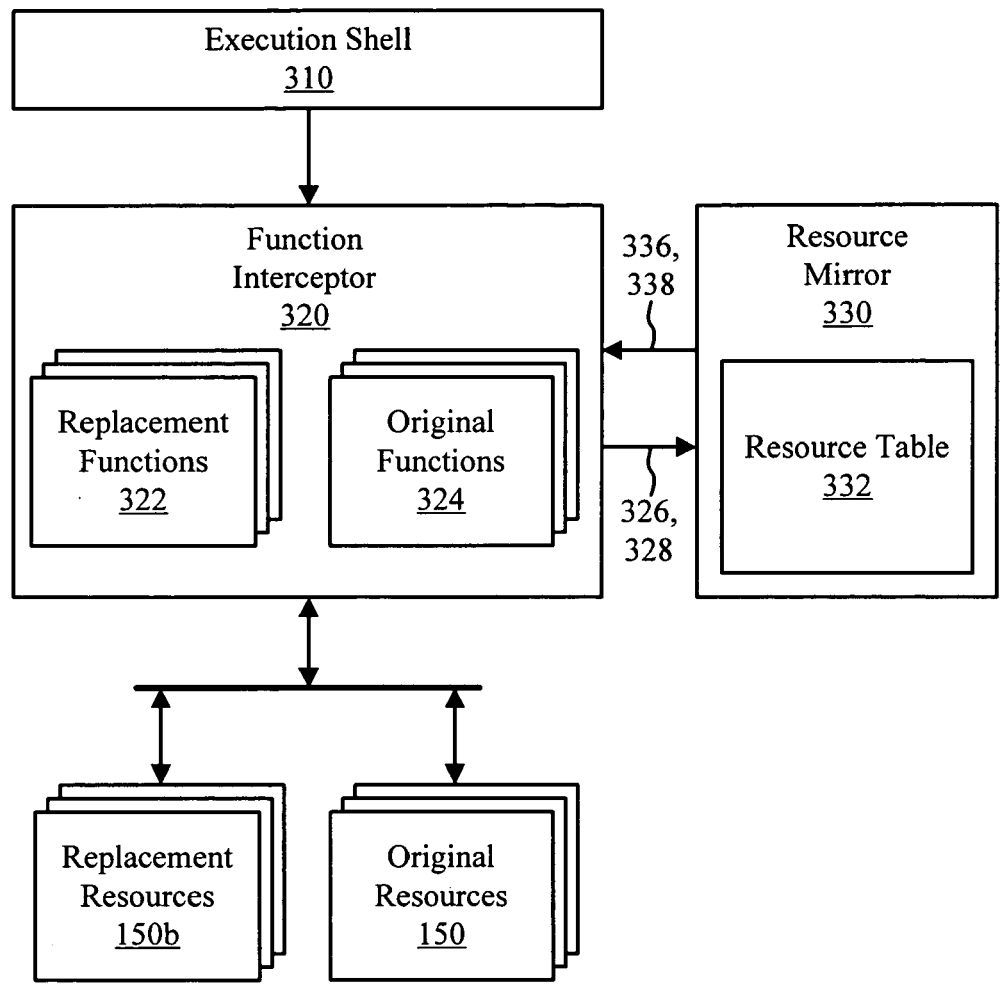
FIG. 3 is a schematic block diagram depicting one embodiment of an unrestricted access simulator of the present invention.

FIG. 3 is a schematic block diagram depicting one embodiment of an unrestricted access simulator 300 of the present invention. The unrestricted access simulator 300 is a specific implementation of portions of FIG. 2. For instance, An execution As depicted, the unrestricted access simulator 300 includes an execution shell 310, a function interceptor 320, a set of replacement functions 322 and original functions 324, a resource mirror 330 with a resource table 332, and a set of replacement resources, 150b and original resources 150. The unrestricted access simulator 300 is a specific implementation of portions of FIG. 2. For instance, the execution shell 310, the function interceptor 320, and the resource mirror 330 may implemented within the simulated access environment 210. The unrestricted access simulator 300 allocates and manages replacement resources 150b in lieu of original resources 150 and in some cases may replace original system functions 324 with replacement functions 322.

The execution shell 310 interacts with the user and responds to commands or interface events generated by the user. For example, a user may type in a command to execute a script or application. In the depicted embodiment, the execution shell 310 launches the requested script or application via system calls. System calls involving restrictable computing resources may be directed to the function interceptor 320. As used in ths document, the term "restrictable resources" is intended to mean resources from which the user may be restricted from accessing but is not necessarily restricted from accessing. The function interceptor 320 may invoke the replacement functions 322 as well as the original functions 324. In one embodiment, a replacement function 322 is invoked only if an original function 324 produces an error.

The function interceptor (module) 320 or the replacement functions 322 may generate an allocation request 326 or a map resource request 328 to the resource mirror 330. The resource mirror 330 (alternately referred to as the resource allocation module 330) allocates replacement resources 150b and responds to the allocation requests 326 and the map resource requests 328. In the depicted embodiment, the resource mirror 330 manages a resource table 332 that maps each reference to an original resource 150a (that is restricted from access) to a corresponding replacement resource 150b. The depicted resource mirror 330 also provides an allocation acknowledgment 336 in response to an allocation request 326 or a replacement resource reference 338 in response to a map resource request 328.

Figure 4:
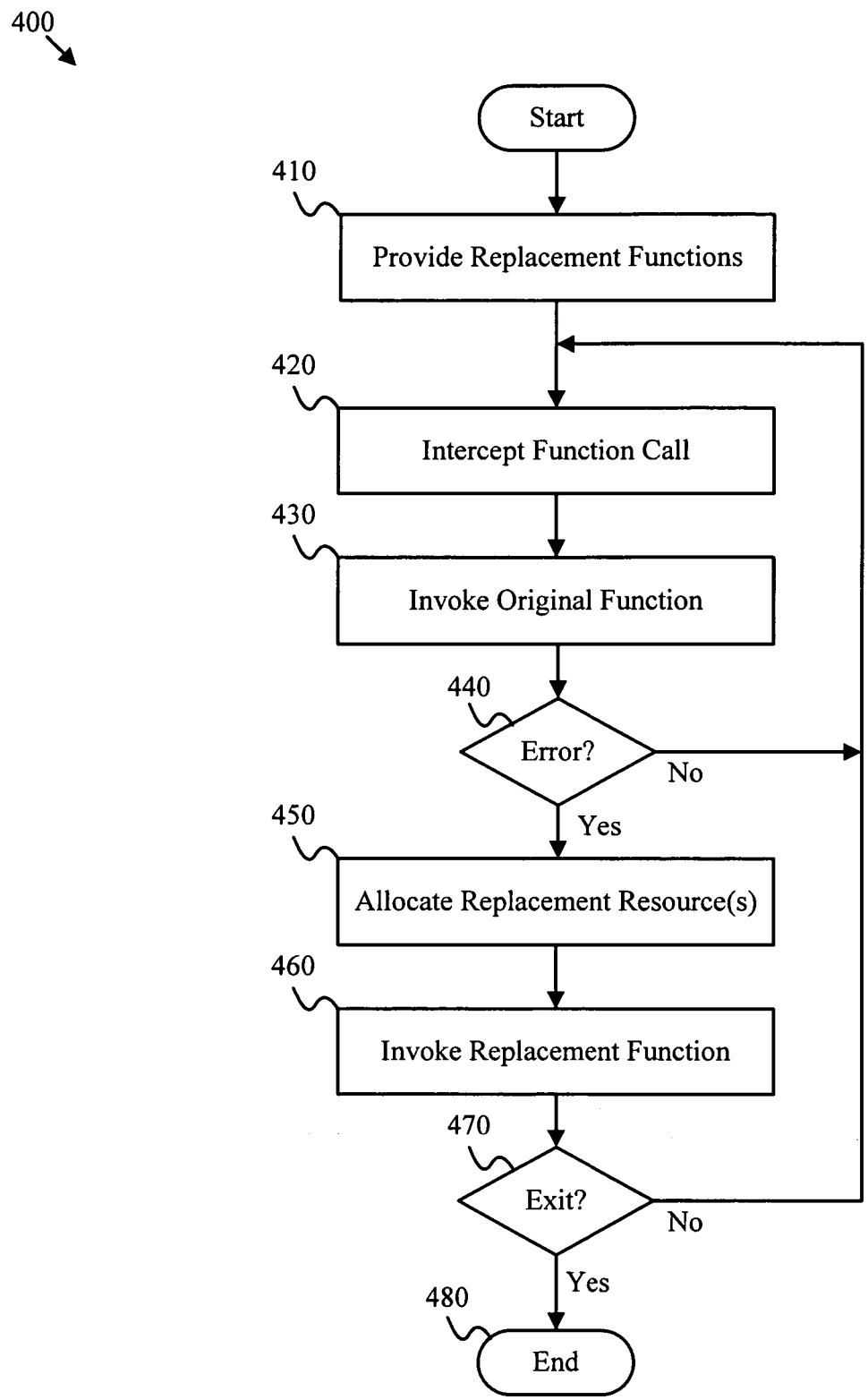
FIG. 4 is a schematic flow chart diagram depicting one embodiment of an unrestricted access method of present invention.

FIG. 4 is a schematic flow chart diagram depicting one embodiment of an unrestricted access method 400 of present invention. As depicted, the unrestricted access method 400 includes providing 410 replacement functions, intercepting 420 a function call, invoking 430 an original function, testing 440 for an error, allocating 450 replacement resources, and invoking 460 a replacement function. The unrestricted access method may be conducted in conjunction with, or independent of the unrestricted access simulator 300 depicted in FIG. 3.

The method 400 begins by providing 410 replacement functions related to potentially restricted resources. In certain embodiments, the replacement functions are provided within a code library that is used to compile the applications 130. In one embodiment, the code library selectively overrides original functions (such as those that pertain to access-restrictable computing resources) with replacement functions.

The method 400 continues by intercepting 420 a function call. In one embodiment, intercepting 420 is accomplished with a software trap. In another embodiment, a pointer within a function table or object is redirected to point to an intercepting function. In the depicted embodiment, the method continues by invoking 430 an original function and testing 440 for an error. If no error occurs, the method 400 loops to the intercept step 420, otherwise the method continues by allocating 450 replacement resources and invoking 460 a replacement function.

In the depicted embodiment, the method continues by testing 470 for an exit request. The exit request may generated, for example, by a user who is logging off, or by a system that is shutting down. In response to an exit request the method ends 470. If no exit request is pending the method loops to the intercept step 420 and continues the process of testing for function call errors, and allocating replacement resources and invoking replacement functions in response to such errors.

Figure 5:
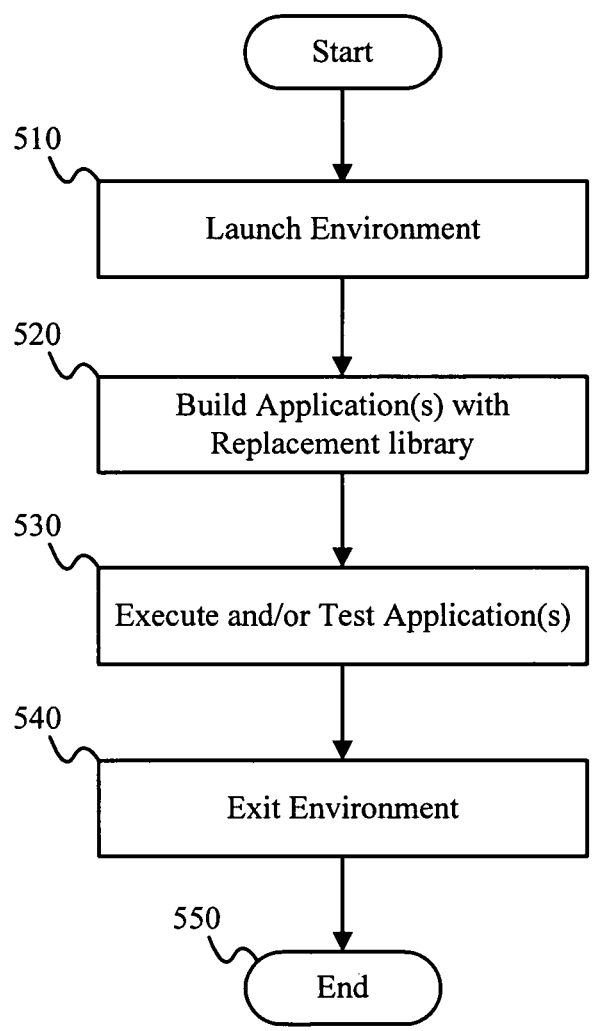
FIG. 5 is a schematic flow chart diagram depicting one embodiment of a build and test method of the present invention.

FIG. 5 is a schematic flow chart diagram depicting one embodiment of a build and test method 500 of the present invention. As depicted, the build and test method 500 includes launching 510 an environment, building 520 one or more applications, executing 530 the applications, and exiting 540 the launched environment. The build and test method 500 may be used in conjunction with the build and test system 200, or may be conducted independent thereof.

The build and test method 500 begins by launching 510 an environment such as the environment 210 that simulates access to restricted computing resources. The depicted method 500 continues by building 520 one or more applications. In one embodiment, building 520 one or more applications includes providing a replacement library with function names that are identical to a standard system library and linking the replacement library to an application via the build script 115. Linking the replacement library to an application facilitates selectively replacing original functions with replacement functions. In another embodiment, the replacement library is dynamically linked to a replacement library and the build step 520 is omitted.

The build and test method 500 continues by executing 530 one or more applications. Executing 530 one or more applications may include executing a test script or exercising the applications in an automated or non-automated manner. Executing 530 may also include switching the current user to another (arbitrary) user. The ability to switch to an arbitrary user provides additional functionality over prior art solutions that are typically restricted to assuming superuser privileges. Subsequent to step 530, the user or script may log off and exit 540 the launched environment.

Figure 6:
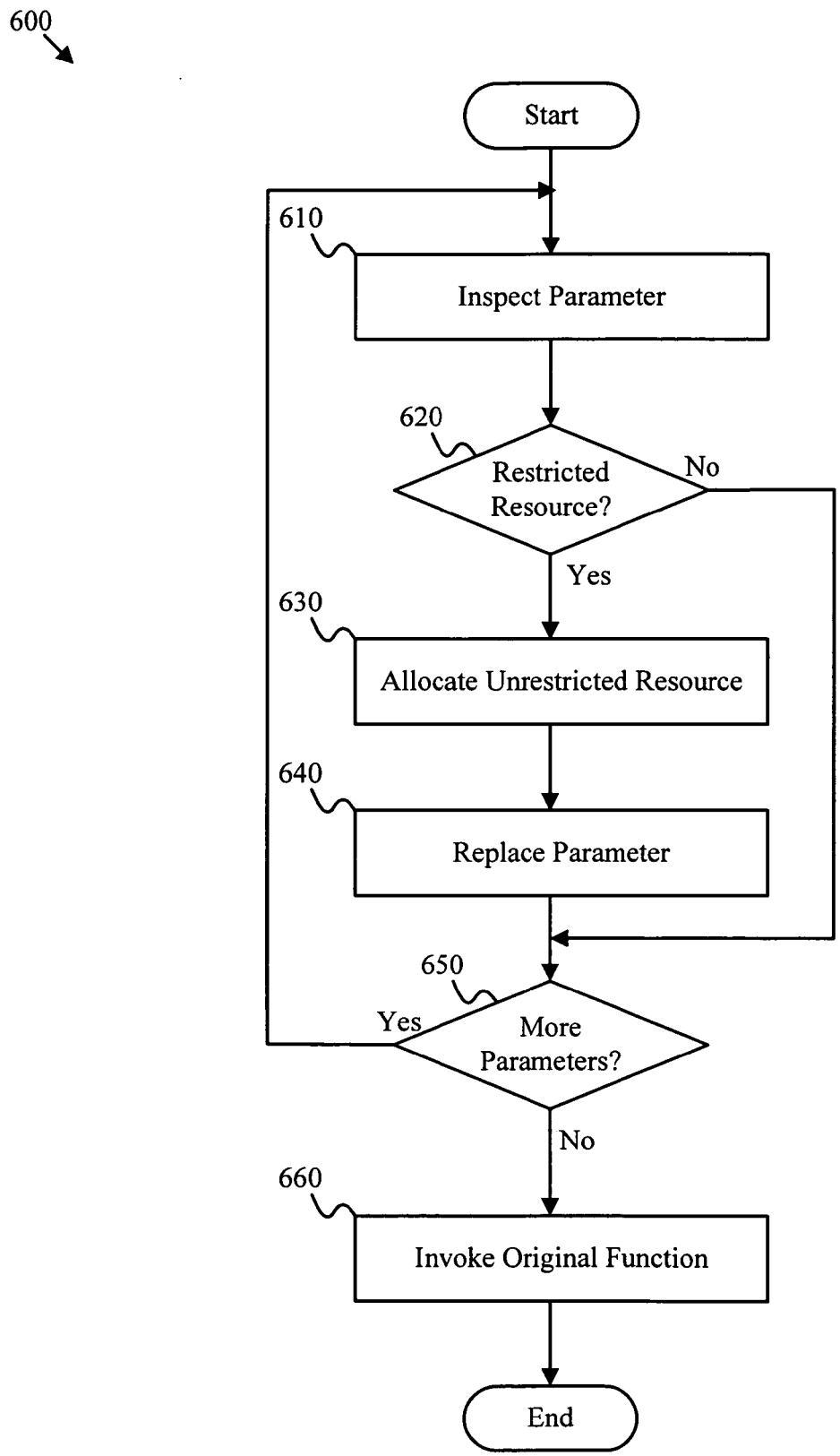
FIG. 6 is a schematic flow chart diagram depicting an alternate embodiment of the unrestricted access method of the present invention.

FIG. 6 is a schematic flow chart diagram depicting an alternate embodiment of the unrestricted access method 400 of the present invention namely an alternate access method 600. As depicted, the alternate access method 600 includes inspecting 610 a parameter, testing 620 for a restricted resource, allocating 630 an unrestricted resource, replacing 640 the parameter, testing 650 for more parameters and invoking 660 an original function. The alternate access method 600 facilitates using replacement resources without the use of replacement functions in environments where the system level code is not open for modification.

The alternate access method 600 may be conducted in conjunction with the function interceptor 320 depicted in FIG. 3. In conjunction with intercepting a function call that may pertain to restricted computing resources, the alternate access method 600 begins by inspecting 610 a parameter for reference to a restricted resource. The method 600 continues by testing 620 for a restricted resource. If a restricted resource is not referenced, the method skips to the more parameters test 650. If a restricted resource is referenced, the method continues by allocating 630 an unrestricted resource.

Allocating 630 an unrestricted resource may include accessing the resource table 332 to ascertain whether an accessible resource 150b corresponding to a (restricted) original resource 150a has already been allocated and allocating an accessible resource 150b if one has not been allocated. Subsequently, the method continues by replacing or changing 640 the parameter to reference the accessible computing resource. The method continues by testing 650 whether all the parameters of the function call have been processed.

If more parameters need to be processed the depicted method loops to the inspect parameter step 610. If no more parameters need to be processed the method continues by invoking 660 the original function. Invoking 660 preferably includes using replacement parameters (provided by step 640) that reference accessible resources instead of resources that are restricted from access by the user.

The present invention simulates access to restricted computing resources by allocating accessible replacement resources and redirecting access to restricted computing resources to the replacement resources. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to simulate access to restricted computing resources, the apparatus comprising:
    a function override module that provides at least one replacement function overriding at least one function call that accesses access-restrictable computing resources, the access-restrictable resources comprising potentially restricted resources, wherein the function override module switches a current user to another user and thereby activate a new set of user privileges;
    a function interceptor module that intercepts a function call, the function call accessing a restricted computing resource, the restricted computing resource comprising a computing resource that an initiator of the function call is restricted from accessing;
    a resource allocation module that allocates an unrestricted computing resource corresponding to the restricted computing resource, the resource allocation module using an application interface to enable interaction with the restricted computing resource;
    wherein a replacement function is invoked in response to intercepting the function call and the replacement function accesses the unrestricted computing resource instead of the restricted computing resource; and
    a hardware implemented digital processing unit that executes the function override module, the function interceptor module, and the resource allocation module.

2. The apparatus of claim 1, wherein the function interceptor module comprises a library of system replacement functions.

3. The apparatus of claim 1, wherein the function interceptor module further invokes the replacement function in response to a failed function call.

4. The apparatus of claim 1, wherein the function interceptor module further replaces references to restricted computing resources.

5. The apparatus of claim 1, wherein the at least one replacement function further invokes an original function, tests the original function for an error, and use the replacement function if an error is present.

6. The apparatus of claim 1, further comprising an environment that interacts with a user in a standard manner.

7. A method to simulate access to restricted computing resources, the method performed via a software module executing on a digital processing unit, the method comprising:
    providing at least one replacement function overriding at least one function call that accesses access-restrictable computing resources, the access-restrictable resources comprising potentially restricted resources;
    switching a current user to another user to activate a new set of user privileges;
    intercepting a function call, the function call accessing a restricted computing resource, wherein the restricted computing resource comprises a computing resource that an initiator of the function call is restricted from accessing;
    allocating an unrestricted computing resource corresponding to the restricted computing resource; and invoking a replacement function that accesses the unrestricted computing resource instead of the restricted computing resource in response to intercepting the function call that accesses the restricted computing resource.

8. The method of claim 7, further comprising providing a library of system replacement functions.

9. The method of claim 7, further comprising invoking a replacement function in response to a failed function call.

10. The method of claim 7, wherein the at least one function call that accesses restrictable computing resources are selected from the group consisting of file system calls, system control calls, and device driver calls.

11. The method of claim 7, wherein the restrictable computing resources are selected from the group consisting of files, directories, devices, processes, and pipes.

12. The method of claim 7, further comprising invoking an original function, testing the original function for an error, and using the replacement function if an error is present.

13. The method of claim 7, further comprising providing an environment that interacts with a user.

14. An apparatus to simulate access to restricted computing resources, the apparatus comprising:
a function override module that provides at least one replacement function overriding at least one function call that accesses access-restrictable computing resources;
a function interceptor module that intercepts a function call, the function call accessing a restricted computing resource, the restricted computing resource comprising a computing resource that an initiator of the function call is restricted from accessing;
a resource allocation module that allocates an unrestricted computing resource corresponding to the restricted computing resource, the resource allocation module using an application interface to enable interaction with the restricted computing resource; and
the function interceptor module further invoking a replacement function that accesses the unrestricted computing resource instead of the restricted computing resource in response to the function interceptor module intercepting the function call that accesses the restricted computing resource;
wherein all or a portion of the function override module, the resource allocation module, and the function interceptor module comprise one or more of hardware and executable code, the executable code stored on one or more storage media and executed by a processor.

15. An apparatus comprising:
a hardware implemented digital processing unit; and
a storage device with a program of machine-readable instructions stored thereon to perform operations to simulate access to restricted computing resources, the program executed by the hardware implemented digital processing unit, the operations comprising:
providing a replacement function overriding a function call that accesses access-restrictable computing resources, the access-restrictable resources comprising potentially restricted resources;
switching a current user to another user to activate a new set of user privileges;
intercepting a function call, the function call accessing a restricted computing resource, wherein the restricted computing resource comprises a computing resource that an initiator of the function call is restricted from accessing;
allocating an unrestricted computing resource corresponding to the restricted computing resource; and
invoking a replacement function that accesses the unrestricted computing resource instead of the restricted computing resource in response to intercepting the function call that accesses the restricted computing resource, the function call invoked by an executable application.

16. The apparatus of claim 15, wherein the instructions further comprise operations to invoke the replacement function in response to a failed function call.

17. The apparatus of claim 15, wherein the function call that accesses access-restrictable computing resources is selected from the group consisting of file system calls, system control calls, and device driver calls.

18. The apparatus of claim 15, wherein the access-restrictable computing resources are selected from the group consisting of files, directories, devices, processes, and pipes.

19. The apparatus of claim 15, wherein the instructions further comprise operations to invoke an original function, test the original function for an error, and use the replacement function if an error is present.

20. The apparatus of claim 15, wherein the instructions further comprise operations to provide an environment that interacts with a user.

21. An apparatus to simulate access to restricted computing resources, the apparatus comprising:
a hardware implemented digital processing unit that executes programs;
an executable application that executes on the hardware implemented digital processing unit;
a plurality of software modules that execute on the hardware implemented digital processing unit, the plurality of software modules comprising a function interceptor module to:
intercept a function call that accesses computing resources that are invoked by the executable application,
inspect a function parameter to determine if the function parameter references a restricted computing resource, wherein the restricted computing resource comprises a computing resource that an initiator of the function call is restricted from accessing,
allocate an unrestricted computing resource corresponding to the restricted computing resource;
replace the function parameter referencing the restricted computing resource with a function parameter referencing the unrestricted computing resource in response to determining that the function parameter references a restricted computing resource, and
execute the function call using the function parameter referencing the unrestricted computing resource instead of the restricted computing resource.

22. The apparatus of claim 21, wherein the function call related to computing resources are selected from the group consisting of file system calls, system control calls, and device driver call.

23. The apparatus of claim 21, wherein the computing resources are selected from the group consisting of files, directories, devices, processes, and pipes.

* * * * *